Patented Aug. 19, 1924.

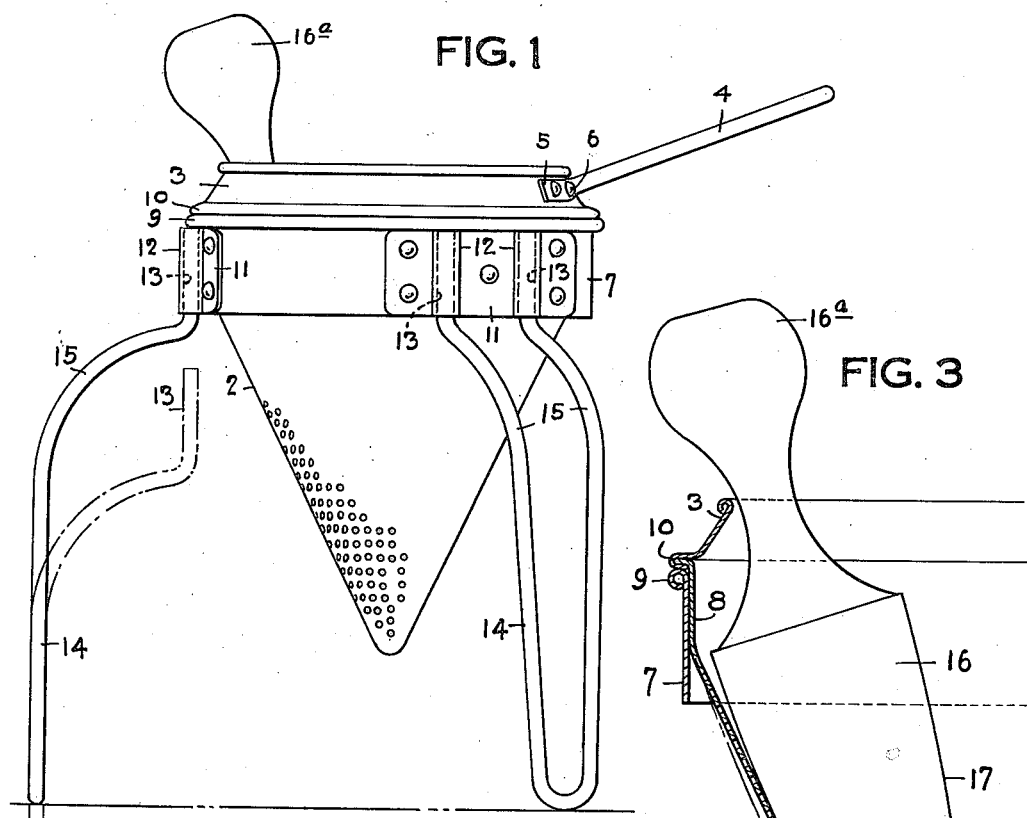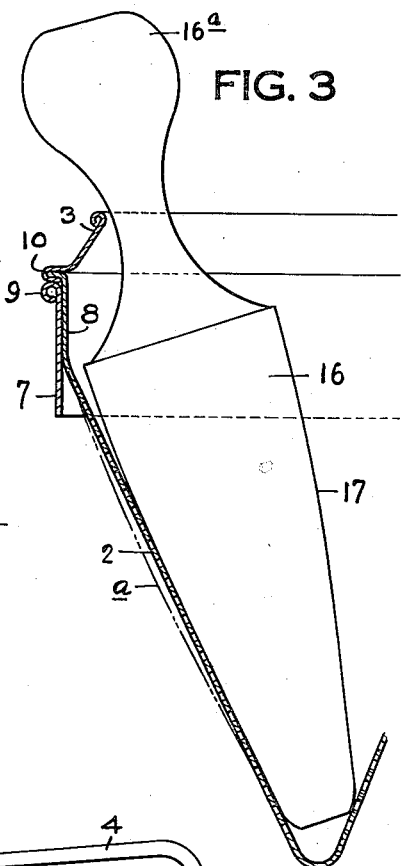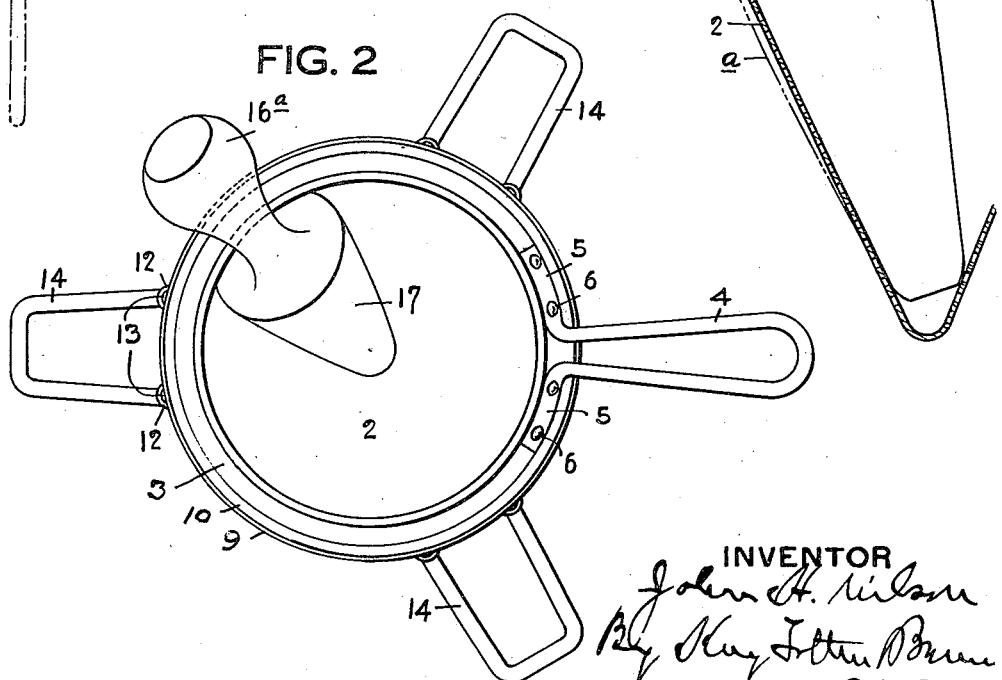

1,505,456

UNITED STATES PATENT OFFICE.

JOHN H. WILSON, OF NEW KENSINGTON, PENNSYLVANIA, ASSIGNOR TO THE ALUMINUM COOKING UTENSIL CO., OF NEW KENSINGTON, PENNSYLVANIA, A CORPORATION OF PENNSYLVANIA.

FRUIT OR VEGETABLE STRAINER.

Application filed April 6, 1922. Serial No. 550,093.

*To all whom it may concern:*

Be it known that I, JOHN H. WILSON, a citizen of the United States, and resident of New Kensington, in the county of Westmoreland and State of Pennsylvania, have invented a new and useful Improvement in Fruit or Vegetable Strainers; and I do hereby declare the following to be a full, clear, and exact description thereof.

This invention relates to a vegetable and fruit-press or strainer, and has particular reference to that type in which a perforated cone-shaped receptacle is mounted in a suitable support in conjunction with a cone-shaped crusher which is adapted to be rolled around within the said receptacle, so that the fruit contained therein will be thoroughly crushed and forced through the perforations.

The object of my invention is to provide for the proper contact of the masher with the inner walls of the receptacle, so that the masher will have contact with the walls of the receptacle for their full height and so give a complete and uniform crushing action throughout the receptacle.

In the drawing, Fig. 1 is a side elevation of my improved fruit or vegetable strainer; Fig. 2 is a plan view thereof; and Fig. 3 is an enlarged sectional detail showing the manner in which the masher is brought into contact with the inner walls of the receptacle for the full height thereof.

Referring to the drawing, the numeral 2 designates the strainer proper which consists of the inverted cone-shaped receptacle made of aluminum or other metal, and formed with perforations. This cone-shaped receptacle is preferably made by the drawing of the metal from a single piece, and is therefore seamless and free from any roughened portions for the lodgement of the material being crushed, so that the receptacle is easily cleaned and kept in a sanitary condition.

The upper end of the receptacle is provided with the inwardly extending lip 3, preferably made in such a manner that it can be fabricated with drawing dies and also assembled by dies, thus eliminating hand work and making a very smooth even joint between said lip and said receptacle.

A handle 4, which may be formed of wire bent in the shape of a U with the flattened lug portions 5, is secured by rivets 6 to the lip 3.

A collar 7 surrounds the upper end of the receptacle 2 and fits snugly around the neck 8 of said receptacle, said collar being provided with the beading 9 which fits against the shoulder 10 where the lip 3 joins the neck 8.

Riveted or otherwise secured to the collar 7 are the straps 11 which are bent to form the sockets 12 to receive the upper ends 13 of the legs 14. These legs are preferably formed of wire of the proper gauge to give the necessary rigidity of support to the receptacle, and are formed U-shaped with the curved portion 15 which throws the legs out beyond the line of the upper portion of the receptacle so as to give a more extended support for said receptacle. The legs 14 are made of metal with a certain amount of resiliency, so that when the ends 13 are inserted in the seats 12 the spring of the metal holds the supports securely in position, said seats being closer together than the ends 13 of the legs when said legs are removed, so that to insert the ends 13 in the seats 12 it is necessary to compress the ends slightly to give the effect of the spring of the metal in holding the legs in place in said seats. By this construction, by grasping the handle 4 the receptacle and legs are lifted without the legs falling therefrom.

The above described stand forms the subject of a divisional application filed by me on the 31st day of May, 1924, Serial No. 717,024.

The cone-shaped crusher 16 which may be made of any suitable material, although preferably made of wood, is provided at its upper end with the knob 16ª. The crusher is slightly bulged, as at 17, so that when the crusher is inserted in the receptacle 2 and pressure is applied to move the crusher around within the receptacle 2 to crush the material and force it through the perforations, the walls of the receptacle being flexible will bulge outwardly, as indicated by the dotted line *a*, Fig. 3 to conform to the shape of the crusher and in this way the crusher will have contact with the walls of the receptacle 2 for practically the entire length, so that there will be a uniform and complete crushing action throughout the length of the crusher.

In operation, this peculiar shape of the crusher provides for the slight spring of the metal on the side of the receptacle toward which the fruit or vegetable is pressed, thus causing the crusher to come in contact with the inside of the strainer from the top to the bottom, thus forcing all of the material through the perforations and eliminating the waste which would otherwise exist if the crusher were made straight and no provision was made for this spring of the metal of the strainer.

What I claim is:

In a fruit or vegetable strainer, the combination of an inverted conical-shaped perforated receptacle formed a flexible metal, and a conical crusher adapted for rolling movement therein, said crusher being bulged intermediate its ends.

In testimony whereof, I, the said JOHN H. WILSON, have hereunto set my hand.

JOHN H. WILSON.

Witnesses:
R. J. BROWN,
J. L. McCAMMON.